US006438567B2

(12) United States Patent
Schöllhorn

(10) Patent No.: US 6,438,567 B2
(45) Date of Patent: Aug. 20, 2002

(54) METHOD FOR SELECTIVE FILTERING

(75) Inventor: Peter Schöllhorn, Holzkirchen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/752,922

(22) Filed: Jan. 2, 2001

Related U.S. Application Data

(63) Continuation of application No. PCT/DE99/01877, filed on Jun. 28, 1999.

(51) Int. Cl.[7] ............................................ G06F 17/10
(52) U.S. Cl. ..................................... 708/313; 708/319
(58) Field of Search ............................... 708/313, 319, 708/300

(56) References Cited

U.S. PATENT DOCUMENTS

| | | | | |
|---|---|---|---|---|
| 5,786,778 A | * | 7/1998 | Adams et al. | 708/313 |
| 6,009,446 A | * | 12/1999 | Dabiri | 708/313 |
| 6,014,682 A | * | 1/2000 | Stephen et al. | 708/313 |

OTHER PUBLICATIONS

Floyd M. Gardner: "Interpolation in Digital Modems—Part I: Fundamentals", IEEE Transactions on Communications, vol. 41, Mar. 1993, No. 3, pp. 501–507.

Uwe Lambrette et al.: "Variable Sample Rate Digital Feedback NDA Timing Synchronization", IEEE Vehicular Technology Conference, vol. 47, New York, 1996, pp. 1348–1352, XP–000741646.

Daeyoung Kim et al.: "Design of Optimal Interpolation Filter for Symbol Timing Recovery", IEEE Transactions on Communications, vol. 45, No. 7, Jul. 1997, pp. 877–884, XP 000659440.

Katrien Bucket et al.: "Periodic Timing Error Components in Feedback Synchronizers Operating on Nonsynchronized Signal Samples", IEEE Transactions on Communications, vol. 49, No. 6, Jun. 1998, pp. 747–749, XP–000779678.

* cited by examiner

*Primary Examiner*—David H. Malzahn
(74) *Attorney, Agent, or Firm*—Laurence A. Greenberg; Werner H. Stemer; Ralph E. Locher

(57) ABSTRACT

A method for digital clock recovery and selective filtering includes prescribing or calculating first coefficients of a prototype of a selective filter at a characteristic frequency fc for a given sampling frequency fa. Second coefficients of a selective filter are calculated at the characteristic frequency fc2 from the first coefficients at points $t_k=\Delta t+k*d$, where k is an integer greater than or equal to 0, by interpolating values of a continuous-time impulse response at points $t_k$, where $$d=\frac{fc2*fa}{fc*fa_1}.$$

The selective filter is operated with the second coefficients at $fa_1$.

14 Claims, 4 Drawing Sheets

16
Output of the loop filter 14
24
Incr0 (idle frequency of the DTO)
Increment
Accumulator
20
26
DTO output
Overflow indication
22

Loop filter
14
Phase detector
12
Output signal
DTO
16
Increment
DTO output
26
Overflow indication
22
Coefficient and filter calculation unit
10
Input signal Overflow indication of the DTOs
36
Load
Output signal
Result memory
34
10
Control unit/counter
Load/reset
32
Selector switch
Arithmetic unit
Arithmetic unit
Arithmetic unit
30
30
30
30
26
Output value of the DTO
Increment of the DTO
Input signal 40
Coefficient
52
Multiplier
Input signal
50
Accumulator
Output signal
Reset Increment of the DTO
Output value of the DTO
Load (accumulator) reset (MAC)
42
Accumulator scaler
44
Coefficient calculation
40
MAC unit
Output signal
Input signal
46
Coefficient memory (ROM)
30

10
Overflow indication of the DTO
136
Control unit/counter
Load
134
Result memory
Output signal
Reset (1 of N)
150
N accumulators
Load (1 of N)
Output value of the DTO
26
142
N accumulators scaler
Increment of the DTO
144
Coefficient calculation
152
Multiplier
146
Coefficient memory (ROM)
Input signal

METHOD FOR SELECTIVE FILTERING

CROSS-REFERENCE TO RELATED APPLICATION

This application is a continuation of copending International Application No. PCT/DE99/01877, filed Jun. 28, 1999, which designated the United States.

BACKGROUND OF THE INVENTION

Field of the Invention

The invention relates to a method for selective filtering with a coefficient and filter calculation unit, a phase detector, a loop filter, and a digital oscillator, these units simulating different selective filters depending on coefficients used for the filter calculation.

Systems for receiving digital data generally require a device for recovering the data clock signal implicitly contained in the signal. In principle, there are two approaches for receiving the data: (1) the clock control loop contains the circuit that supplies the sampling clock of the analog/digital converter ("ADC") (e.g. VCXO); and (2) the clock signal of the ADC is asynchronous with respect to the data clock. A fully digital control circuit calculates by interpolation from the output values of the ADC samples in a timing pattern that is synchronous with the data clock. There exist prior art circuits that achieve the task in baseband. Most applications have filters upstream or downstream of the ADC, which filters select the signal that is intended to be processed, i.e., suppress adjacent signals and other interference signals. These filters are generally optimized for a fixed bandwidth or data rate, such as, e.g., surface acoustic wave filters. Stringent requirements regarding phase linearity are usually imposed on the filter so that the pulse shape of the data signals is not distorted.

Basic theories with regard to fully digital clock recovery in digital modems by interpolation are discussed in an article by Floyd M. Gardener titled "Interpolation in Digital-Modems -Part I: Fundamentals". The article appeared in the journal IEEE Transactions on Communications, Vol. 41, No. 3, in March 1993.

A further approach in the prior art uses analog filters having a controllable bandwidth upstream of the ADC. However, these filters are expensive and, particularly in CMOS technology, are difficult to integrate on a circuit. Analog filters fundamentally have phase distortions that have to be reduced using additional circuits. Moreover, the sampling frequency of the ADC has to be adapted to the signal bandwidth.

Another approach lies in providing a multistage digital selection filter upstream of the clock recovery and in carrying out the fine adjustment of the sampling frequency by interpolation again. After each stage of the filter, the sampling rate is reduced by a fixed factor. The approach has a disadvantage in that many filter stages are required for small bandwidths. Thus, the filter becomes complicated. Moreover, a fixed gradation means that not all the interference components can be suppressed, which generally leads to an increase in outlay in the downstream interpolator.

Lambrette U et al.: "VARIABLE SAMPLE RATE DIGITAL FEEDBACK AND TIMING SYNCHRONIZATION" in I.E.E.E. Vehicular Technology Conference, New York, USA, I.E.E.E., Bd. Conf. 47, pages 1348–1352, discusses two algorithms for digital receivers for processing a broader range of different sampling rates. One of the algorithms is also based on filtering the received signals prior to the time synchronization. A time synchronization algorithm is presented that is not data-aided, is based on digital feedback, and can process symbol rates deviating from a sampling rate.

The paper by D. Kim et al.: "DESIGN OF OPTIMAL INTERPOLATION FILTER FOR SYMBOL TIMING RECOVERY" in I.E.E.E. Transactions on Communications, I.E.E.E. Inc., New York, USA, Vol. 45, No. 7, pages 877–884, discloses an optimized interpolation filter for recovering the symbol timing in a digital receiver, in which the sampling rate of the analog-to-digital converter on the input side is not synchronized with the symbol clock of the transmitter.

The paper by K. Bucket et al. "PERIODIC TIMING ERROR COMPONENTS IN FEEDBACK SYNCHRONIZERS OPERATING ON NONSYNCHRONIZED SIGNAL SAMPLES" I.E.E.E. Transactions on Communications, I.E.E.E. Inc., New York, USA, Vol. 46, No. 6, pages 747–749, reveals that the synchronization error contains periodic components through a loop for timing recovery on detection of nonsynchronized samples of a noisy sine signal. These periodic errors are produced exclusively by non-ideal interpolation between the nonsynchronized signal samples and disappear when synchronized sampling is performed.

SUMMARY OF THE INVENTION

It is accordingly an object of the invention to provide a method for selective filtering that overcomes the hereinafore-mentioned disadvantages of the heretofore-known devices and methods of this general type and that can be realized with little outlay.

With the foregoing and other objects in view, there is provided, in accordance with the invention, a method for selective filtering, including the steps of simulating different selective filters with a coefficient and filter calculation unit, a phase detector, a loop filter, and a digital oscillator depending on first and second coefficients used for filter calculation, determining the first coefficients of a prototype of a further selective filter at a characteristic frequency fc for—given sampling frequency fa, calculating the second coefficients of the further selective filter at a characteristic frequency fc2 from the first coefficients at points $t_k=\Delta t+k*d$, where k=0, 1, . . . , the further selective filter to be operated at a sampling rate $fa_1$, by interpolating values of a continuous-time impulse response of a simulation of the further selective filter at points $t_k$, where $$d=\frac{fc2*fa}{fc*fa_1},$$

simulating the further selective filter with the second coefficients using the coefficient and filter calculation unit, the phase detector, the loop filter, and the digital oscillator, and operating the further selective filter at the sampling rate $fa_1$.

The approach employed by the invention is to use a filter disclosed in International PCT publication WO-A-00/02311, filed Jan. 13, 2000, corresponding to PCT/DE 99/01878 and U.S. patent application Ser. No. 09/752,923 filed Jan. 2, 2001 by the same inventor and to combine it with a variant of a prior art clock recovery circuit with an interpolation filter. As such, the approach of deriving filter coefficients from the coefficients of a prototype filter is extended in order to additionally realize a variable delay that is required for the interpolation of the data signal and that must generally be shorter than the period of the ADC clock signal. Moreover, use is made of the fact that the filter bandwidth is always proportional to the data rate, i.e., the bandwidth and the decimation factor of the filter are in a fixed relationship with respect to one another. Correspondingly, in qualitative terms, there is more time available for calculating an output value of the filter, the lower the data rate or the bandwidth of the filter. On the other hand, it is also the case that more coefficients are required for calculating the output value given a smaller bandwidth. Meaning, in quantitative terms, that the same number of arithmetic operations per second is always required regardless of the data rate or the filter bandwidth. A suitable circuit is described below. A variant that is optimized in respect of outlay is likewise presented, for a case where the operating clock of the circuit is higher than the sampling clock at the filter input.

The circuits described below accomplish two tasks: (1) to realize low-pass filters having a bandwidth proportional to the data rate for suppressing adjacent signals; and (2) generating an output signal that is phase-synchronous with the data clock by interpolation because the sampling clock of the input signal is not synchronous with the data clock (free-running oscillator).

In order to accomplish the second task, a control loop including a phase detector, a loop filter, and a digital oscillator ("DTO") is used. The oscillator is realized as an overflowing accumulator. If an overflow occurs, then a sample is interpolated from the samples of the input signal and feeds the phase detector and downstream circuits. In the steady-state condition, some of these interpolated values lie—as desired—in the center of the data pulses. The interpolated signal usually has a sampling frequency corresponding to twice the data rate (or symbol rate in the case of two-dimensional data transmission such as, e.g., QPSK or QAM). Because the two clock signals are asynchronous, the sampling instants of the signal to be interpolated generally lie between the sampling instants of the input signal. Therefore, a signal is derived from the state of the DTO after the overflow, the derived signal specifying the time interval between the desired sampling instant and the last sampling instant of the input signal. The input signal must be temporally shifted by the interval amount by the interpolation filter.

The invention accomplishes the second task by taking into account, during the interpolation of the filter coefficients from the coefficients of a prototype, not only the desired bandwidth but also the desired temporal shift. This also indicates how the invention accomplishes the first task. The bandwidth of the decimating interpolation filter must be adapted to the data rate. For example, the output signal of the loop filter can be used for such a purpose. In the steady-state condition, the output signal is proportional to the difference between the desired interpolation rate and the idle frequency of the DTO. Because the idle frequency is prescribed, it is possible to form a signal that is exactly proportional to the desired bandwidth of the filter. The loop filter has an integral element whose output signal has, in principle, the same properties, coupled with the additional advantage that the signal has significantly less noise than the output signal of the overall filter.

If, for a bandwidth fc1 of the decimating interpolation filter, M1 coefficients are required for calculating output values at the rate fa1, then M2=M1fc1/fc2 coefficients are required in the proposed method for calculating the filter coefficients for a bandwidth fc2 and an output rate fa2=fa1*fc2/fc1. It follows, therefore, that the same processing speed is required in both cases, because fa1*M1=fa2*M2. Correspondingly, it is possible, in principle, always to carry out the filter calculation with the same number of arithmetic elements, regardless of the data rate. The prototype is dimensioned for a bandwidth fc at a sampling frequency fa. In principle, the two characteristic frequencies are arbitrary, but in individual cases fc must be chosen to be low enough that, taking account of the chosen method for interpolating the coefficients, the accuracy requirements of the respective application are met. If the decimating interpolation filter is intended to have a bandwidth fc2—matching the sampling rate fa2 after decimation—and to be operated at a sampling frequency fa1, then an "expansion factor" d=(fc2/fc)*(fa/fa1) results, i.e., the sampling pattern of the prototype must be "expanded" by the factor d.

If the intention is to interpolate the samples of the data signal at the sampling frequency fa2, then the DTO of the control loop must be operated with the increment ΔI=fa2/fa1 (ΔI is supplied by the DTO, see above). As such, it is assumed that the DTO is operated at the sampling frequency fa1 and overflows at the value 1 (i.e., the output values of the DTO lie between 0 and 1). The output value I0 after the overflow can have the value ΔI at most. It is defined that the coefficients of the prototypes are situated at points t=n where n=0, 1, etc. Correspondingly, the coefficients of the required filter that are to be interpolated are situated at the points t=Δt+k*d, where k=0, 1, etc., and the value Δt is defined by the control loop. The term k*d can be converted into k*ΔI*(fa/fc)*(fc2/fa2)=k*ΔI*r, where r is a constant factor (fa/fc is defined in the configuration of the prototype and problems dictate that fc2/fa2 is a constant). It likewise follows that t=Δt+k*d=(I0+k*ΔI)*r, where I0+k*ΔI—disregarding noise terms—represent the output values of the DTO in the steady-state condition. It is thus the case that Δt=IO*r, in particular, holds true, i.e., the output value of the DTO after an overflow is multiplied by the constant r and is then used as a start value for the interpolation of the filter coefficients.

In accordance with another mode of the invention, the determining step is performed by prescribing or calculating first coefficients of a prototype of a further selective filter at a characteristic frequency fc for a given sampling frequency fa.

In accordance with a further mode of the invention, output values I0+k*ΔI are produced with the digital oscillator, and using the output values I0+k*ΔI for calculating Δt+k*d.

In accordance with an added mode of the invention, a sampled data signal is selectively filtered and an output value of the digital oscillator after an overflow I0, multiplied by the constant $$r = \frac{fa * fc2}{fc * fa2},$$

is used for a start value Δt for an interpolation of the second coefficients (h2(t)), where fa2 represents a sampling frequency at which the data signal is interpolated.

In accordance with an additional mode of the invention, an overflowing accumulator is used as the digital oscillator.

In accordance with yet another mode of the invention, the accumulator is fed with an increment formed by adding an output signal of the loop filter to a value (Incr0) defining an idle frequency of the digital oscillator.

In accordance with yet a further mode of the invention, an input signal is fed to arithmetic units operating in parallel, each of the arithmetic units calculating a future output value of a selective filter, and an output value of an arithmetic unit having already finished a calculation at the time of the overflow is selected in the event of an overflow of the digital oscillator.

In accordance with yet an added mode of the invention, a number N of arithmetic units operating in parallel is defined based on a number K of coefficients of the selective filter simulated respectively by the coefficient and filter calculation unit, the phase detector, the loop filter, and the digital oscillator, according to the following conditions:

$$N >= \frac{K \cdot fc \cdot fa2}{fa \cdot fc2},$$

where N is an integer.

In accordance with yet an additional mode of the invention, the arithmetic units are selected with a modulo-N counter, the arithmetic units are cyclically addressed with the modulo-N counter, and the modulo-N counter is incremented with each overflow of the digital oscillator.

In accordance with again another mode of the invention, a sampled data signal is selectively filtered, an accumulator in each arithmetic unit is reset if the arithmetic unit is addressed, the arithmetic unit is loaded with an output value of the digital oscillator after the overflow, an instantaneous increment value of the digital oscillator is stored, the instantaneous increment value is accumulated for each sampling clock of the input signal, an output value of the accumulator is scaled with a value $$r = \frac{fa * fc2}{fc * fa2},$$

for each input clock, where fa2 represents a sampling frequency at which the data signal is interpolated.

In accordance with again a further mode of the invention, a position is defined with a scaled output value of the accumulator at which a second coefficient must be interpolated for the further selective filter from the first coefficients of the prototype.

In accordance with again an added mode of the invention, a single coefficient calculation unit is provided, the second coefficients are calculated sequentially in time with the single coefficient calculation unit, the filter output values are calculated sequentially in time in a multiplier and splitting the filter output values between N accumulators, and the respective input values are selectively stored in N further accumulators.

In accordance with a concomitant mode of the invention, the respective input values are an increment and output value of the digital oscillator.

Other features that are considered as characteristic for the invention are set forth in the appended claims.

Although the invention is illustrated and described herein as embodied in a method for selective filtering, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figures 1, 2:
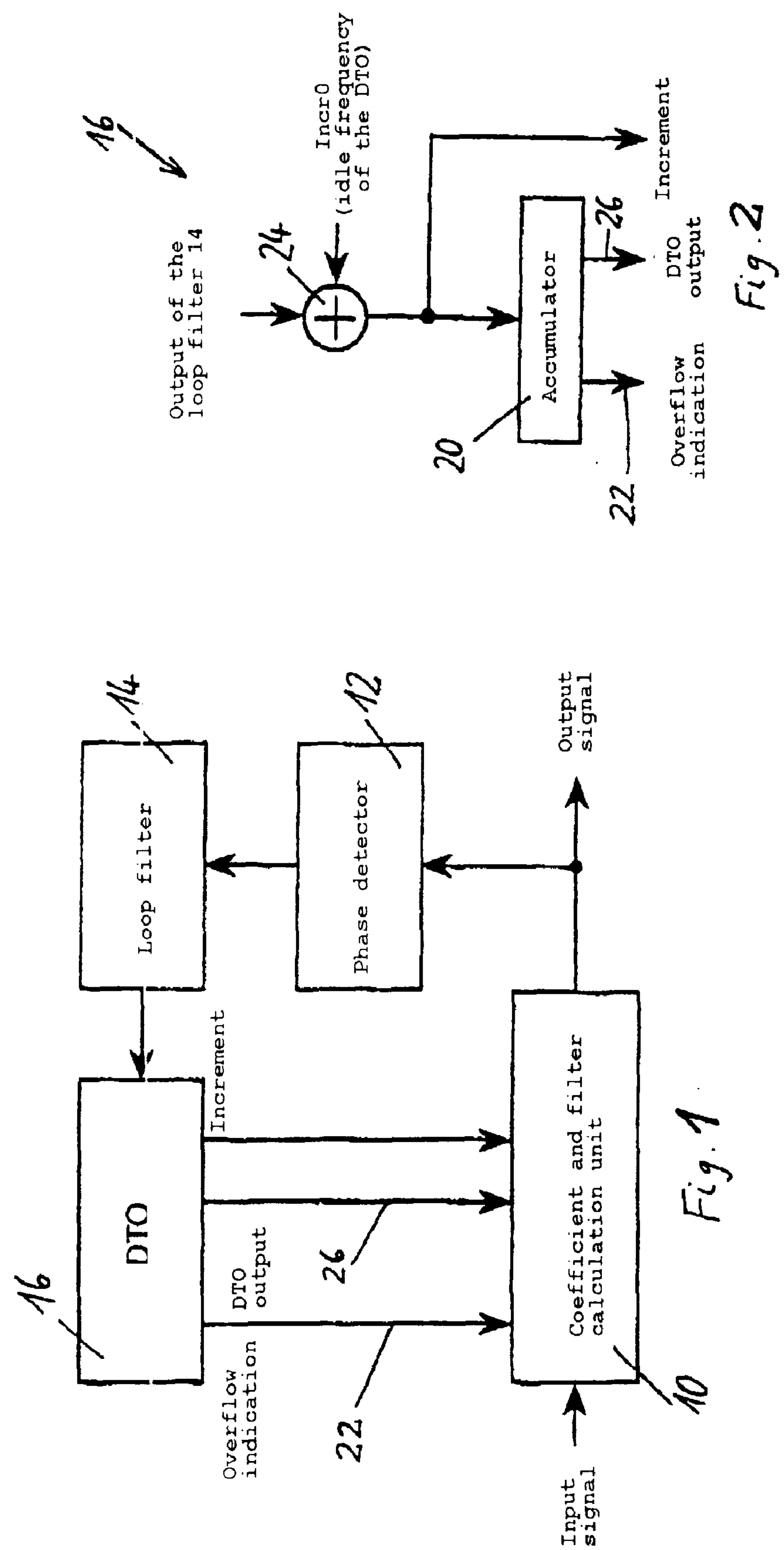
FIG. 1 is a block circuit diagram for carrier recovery with a decimating interpolation filter according to the invention.
FIG. 2 is a block and schematic circuit diagram of a digital values of FIG. 1.

In all the figures of the drawing, sub-features and integral parts that correspond to one another bear the same reference symbol in each case.

Referring now to the figures of the drawings in detail and first, particularly to FIG. 1 thereof, there is shown a basic circuit diagram for carrier recovery with a decimating interpolation filter. The control loop for clock recovery is illustrated including a coefficient and filter calculation unit 10, a phase detector 12, a loop filter 14, and a digital oscillator 16. In the configuration, the input signals are fed to the coefficient and filter calculation unit 10, which calculates the output signals from the input signals. The output signals are fed not only to the output but also to the phase detector 12, which is, in turn, connected to the loop filter 14. The output of the loop filter 14 is fed to the digital oscillator 16. The digital oscillator 16 outputs to the coefficient and filter calculation unit 10 the signals “DTO output”, “overflow indication,” and “increment” for controlling the calculation unit 10.

FIG. 2 further illustrates the digital oscillator 16 (DTO). At its heart, the DTO 16 includes an accumulator 20 with overflow (“wrap around”, sawtooth-waveform output signal). The accumulator 20 is fed by an increment formed by adding the output signal of the loop filter 14 to a value Incr0. The value Incr0 defines the idle frequency of the DTO 16. The DTO increment is passed on to the coefficient calculation unit 10. (The value Incr0+integral element of the output signal of the loop filter can also be output here.) Furthermore, in the case of each accumulator overflow, a new calculation of a filter output value is initiated by the overflow indication 22 of the accumulator 20.

Moreover, the DTO 16 includes a summing unit 24, in which the output of the loop filter 14 and the value Incr0 are added. The value “increment”, which corresponds to the current sum of the output of the loop filter 14 and the value Incr0, can be picked off at the output of the adder 24. The content of the accumulator 20 is available at the DTO output 26.

Figure 3:
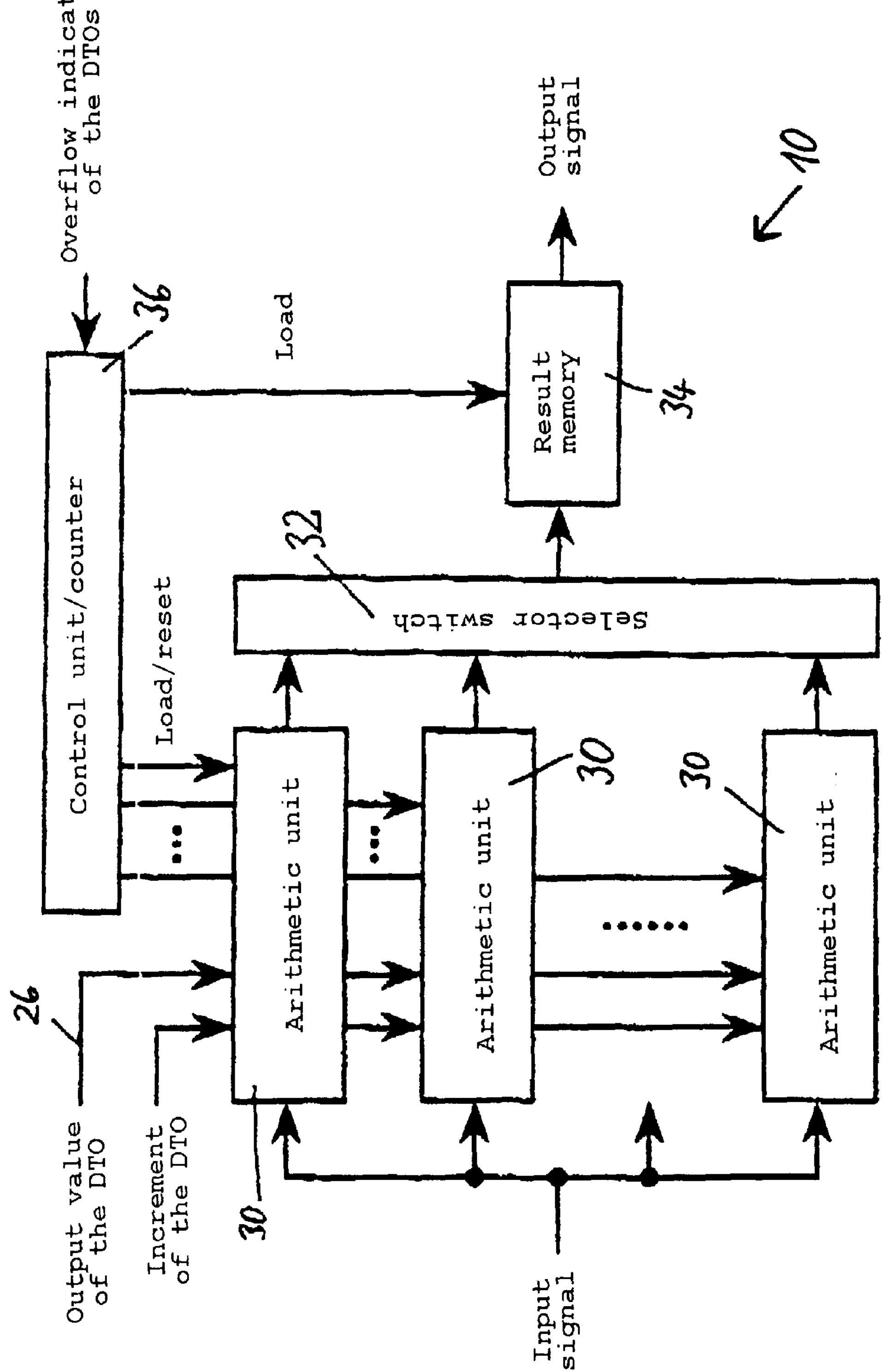
FIG. 3 is a block circuit diagram of a combined unit for calculating both the filter coefficients and the filter output values of FIG. 1.

FIG. 3 details the coefficient and filter calculation unit 10, which serves for calculating the filter output values. The input signal feeds a plurality of arithmetic units 30 operating in parallel. Each of these units 30 calculates a future output value of the filter. The number N of units 30 required is defined by the number of coefficients of the prototype filter ($N \geqq 1/r^*$ (number of coefficients of the prototype filter) and N is an integer. If a DTO overflow is signaled, the output value of the arithmetic unit 30 that has already finished the filter calculation at this point in time is copied into the result memory 34 through a selector switch 32. The arithmetic unit 30 is subsequently initialized. At its heart, the control unit 36 has a “modulo counter,” which cyclically addresses the arithmetic units 30. The modulo counter is incremented with each DTO overflow.

Feeding the input signal to all N arithmetic units 30 configures the coefficient and filter calculation unit 10. The output value 26 of the DTO 16 and the increment signal thereof are likewise fed to all of the units 30. Also provided is a control unit 36 with a modulo counter and N outputs, each of which is selectively connected to one of the arithmetic units 30. The modulo counter in the control unit 36 is advanced with the overflow indication of the DTO 16. At the same time, in the case of each overflow, the command "load" is output for the result memory.

Figure 4:
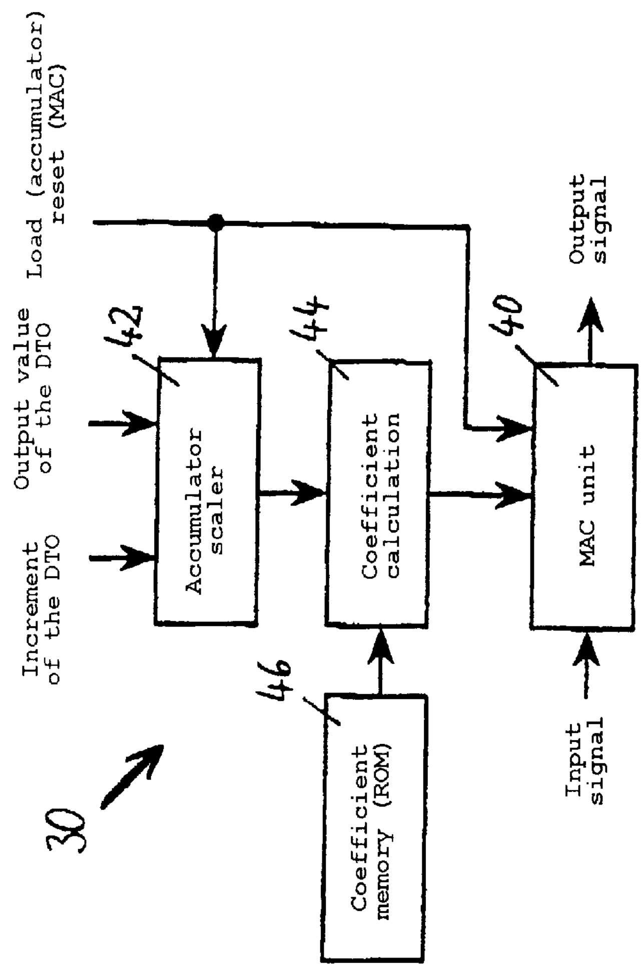
FIG. 4 is a block circuit diagram of an arithmetic unit from FIG. 3.

FIG. 4 illustrates the arithmetic unit 30 in detail. The arithmetic unit 30 includes a MAC unit 40 that is illustrated in more detail in FIG. 5. The MAC unit 40 is fed with the input signal and, from this, supplies an output signal to the selector switch 32. Furthermore, the arithmetic unit 30 has an accumulator with a scaler that buffer-stores and scales the values Increment of the DTO 16 and output value 26 of the DTO 16. These values are then fed to a coefficient calculation unit 44, which supplies the coefficients for the MAC unit 40. For such purpose, the coefficient calculation unit 44 is connected to a coefficient memory 46, from which the corresponding coefficient values for the prototype filter can be read out respectively.

Figure 5:
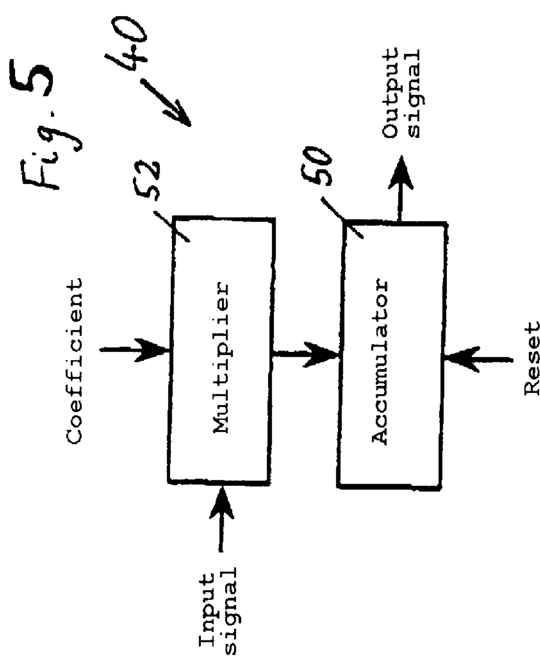
FIG. 5 is a block circuit diagram of a MAC unit from FIG. 4.

The construction of the MAC unit 40 is illustrated in detail in FIG. 5. The MAC unit 40 includes a multiplier 52, to which the input signal and the corresponding coefficient from the coefficient calculation unit 44 are fed. The output value of the multiplier is stored in the accumulator 50. As a result, the accumulator 50 makes the output signal available permanently, which signal is then fed to the selector switch 32. The accumulator 50 is reset by the selection/initialization command from the control unit 36.

The arithmetic unit 30 functions as follows. If the arithmetic unit 30 is selected by the control unit 36, (1) the accumulator 50 of the MAC unit 40 is reset, (2) the accumulator 42 upstream of the coefficient calculation unit 44 is loaded with the instantaneous output value 26 of the DTO 16 (value after the overflow), and (3) the instantaneous increment value of the DTO 16 is stored. After the initialization, the increment is accumulated in the case of each sampling clock of the input signal.

The output value of the accumulator 42 is scaled with the value "r" in the case of each input clock. The result defines the position at which a coefficient must be interpolated from the coefficients of the prototype filter (the interpolation method is arbitrary, in principle). The calculated coefficient is multiplied by the current filter input value and is subsequently accumulated.

Figure 6:
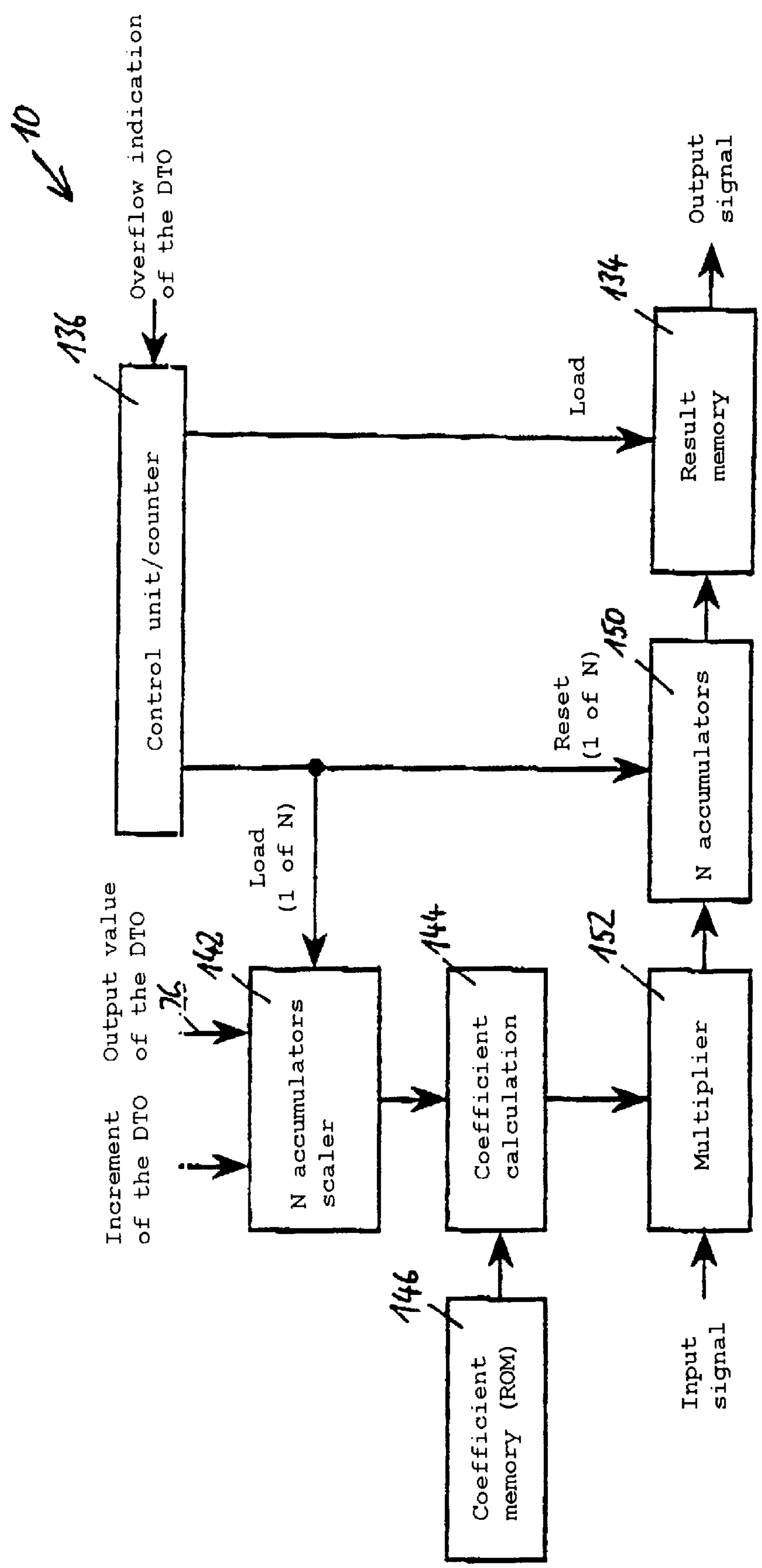
FIG. 6 is a block circuit diagram of a modified arithmetic unit for the case where at least N operating clocks are available per clock of the input signal.

FIG. 6 shows a modified embodiment of the invention that can be used when at least N operating clocks are available per clock of the input signal. In such a case, N arithmetic units 30 are not required. Rather a single multiplier 152 and a single unit 144 for calculating the filter coefficients (including ROM 146 and scaler) suffices.

Thus, FIG. 6 shows a modified coefficient and filter calculation unit 10, which, just like the coefficient and filter calculation unit 10 described above in FIGS. 2 to 5, can be used at the corresponding point in FIG. 1. For the configuration, the input signal is fed only to a single multiplier 152, but, from there, it is selectively split between N accumulators 150 and fed from the accumulators 150, in turn, to the result memory 134. The result memory 134 then always contains the output signal. A control unit 136 is also provided and is connected to the overflow indication of the DTO 16. The control unit 136 includes a "modulo counter" for driving the N accumulators 150. In this case, too, the multiplier 152 is driven by the coefficient calculation unit 144, which once again reads the values of the prototype coefficients from the ROM memory 146. N accumulators 142 are additionally provided for storing N different values for the increment of the DTO 16 and the output value 26 of the DTO 16. These accumulators 142 also receive their load command selectively from the control unit 136.

One of the N accumulators drives the unit cyclically. The N accumulators downstream of the multiplier can be combined to form a circuit containing an adder and N memory cells.

I claim:

1. A method for selective filtering, which comprises:

simulating different selective filters with a coefficient and filter calculation unit, a phase detector, a loop filter, and a digital oscillator depending on sets of first and second coefficients used for filter calculation;

determining a first set of coefficients of a prototype of a further selective filter at a characteristic frequency fc for a given sampling frequency fa;

calculating a second set of coefficients of the further selective filter at a characteristic frequency fc2 from the first coefficients at points $t_k=\Delta t+k*d$, where k=0, 1, . . . , the further selective filter to be operated at a sampling rate $fa_1$, by interpolating values of a continuous-time impulse response of a simulation of the further selective filter at points $t_k$, where $$d = \frac{fc2 * fa}{fc * fa_1};$$

emulating the further selective filter with the second coefficients using the coefficient and filter calculation unit, the phase detector, the loop filter, and the digital oscillator; and operating the further selective filter at the sampling rate $fa_1$.

2. The method according to claim 1, which further comprises performing the determining step by prescribing the first set of coefficients of a prototype of a further selective filter at a characteristic frequency fc for a given sampling frequency fa.

3. The method according to claim 1, which further comprises performing the determining step by calculating the first set of coefficients of a prototype of a further selective filter at a characteristic frequency fc for a given sampling frequency fa.

4. The method according to claim 1, which further comprises utilizing output values $I0+k*\Delta I$ with the digital oscillator while using the output values $I0+K*\Delta I$ for calculating $\Delta t+k*d$, wherein $\Delta I$ is an increment provided by the digital oscillator and I0 is the start value after an overflow of the digital oscillator.

5. The method according to claim 1, which further comprises:

using an output value of the digital oscillator after an overflow I0, multiplied by the constant $$r = \frac{fa * fc2}{fc * fa2},$$

for generating a start value $\Delta t$ for an interpolation of the second set of coefficients based on a data signal, where fa2 represents a sampling frequency at which the data signal is interpolated in order to selectively filter a sampled data signal.

6. The method according to claim 1, which further comprises using an overflowing accumulator as the digital oscillator.

7. The method according to claim 6, which further comprises feeding the accumulator with an increment formed by adding an output signal of the loop filter to a value defining an idle frequency of the digital oscillator for generating the output value of the digital oscillator.

8. The method according to claim 1, which further comprises:

feeding an input signal to arithmetic units operating in parallel, each of the arithmetic units calculating a future output value of a selective filter; and selecting, in the event of an overflow of the digital oscillator, an output value of an arithmetic unit having already finished a calculation at the time of the overflow for generating a selectively filtered sampled data signal.

9. The method according to claim 8, which further comprises defining a number N of arithmetic units operating in parallel based on a number K of coefficients of the selective filter simulated respectively by the coefficient and filter calculation unit, the phase detector, the loop filter, and the digital oscillator, according to the following conditions:

$$N >= \frac{K \cdot fc \cdot fa2}{fa \cdot fc2},$$

where N is an integer.

10. The method according to claim 8, which further comprises:

utilizing modulo-N counter for selecting the arithmetic units;

cyclically addressing the arithmetic units with the modulo-N counter; and incrementing the modulo-N counter with each overflow of the digital oscillator.

11. The method according to claim 10, which further comprises:

resetting an accumulator in each arithmetic unit if the arithmetic unit is addressed;

loading the arithmetic unit with an output value of the digital oscillator after the overflow of the digital oscillator;

storing an instantaneous increment value of the digital oscillator;

accumulating the instantaneous increment value for each sampling clock of the input signal;

scaling an output value of the accumulator with a value $$r = \frac{fa * fc2}{fc * fa2}$$

for each input clock pulse, where fa2 represents a sampling frequency at which the data signal is interpolated for selectively filtering a sample data signal.

12. The method according to claim 11, which further comprises defining, with a scaled output value of the accumulator, a position at which a second coefficient must be interpolated from the first coefficient of the prototype at this distinct position for the further selective filter.

13. The method according to claim 1, which further comprises:

providing a single coefficient calculation unit;

calculating the second set of coefficients sequentially in time with the single coefficient calculation unit;

calculating the filter output values sequentially in time in a multiplier and splitting the filter output values between N accumulators; and selectively storing the respective input values in N further accumulators.

14. The method according to claim 13, wherein the respective input values are an increment and output value of the digital oscillator.

* * * * *